United States Patent
Gaubatz et al.

(10) Patent No.: US 10,621,426 B2
(45) Date of Patent: Apr. 14, 2020

(54) AUTHENTICATION OF PRINTED DOCUMENTS

(71) Applicant: Hewlett-Packard Development Company, L.P., Houston, TX (US)

(72) Inventors: Matthew D Gaubatz, Seattle, WA (US); Peter J Jlammer, Corvallis, OR (US); Karl Walters, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 50 days.

(21) Appl. No.: 15/511,806

(22) PCT Filed: Sep. 23, 2014

(86) PCT No.: PCT/US2014/057039
§ 371 (c)(1),
(2) Date: Mar. 16, 2017

(87) PCT Pub. No.: WO2016/048289
PCT Pub. Date: Mar. 31, 2016

(65) Prior Publication Data
US 2017/0308744 A1 Oct. 26, 2017

(51) Int. Cl.
*G06K 9/00* (2006.01)
*G07D 7/1205* (2016.01)
*G07D 7/12* (2016.01)

(52) U.S. Cl.
CPC ..... *G06K 9/00442* (2013.01); *G06K 9/00577* (2013.01); *G07D 7/12* (2013.01); *G07D 7/1205* (2017.05); *G06K 2009/0059* (2013.01)

(58) Field of Classification Search
CPC combination set(s) only.
See application file for complete search history.

(56) References Cited

U.S. PATENT DOCUMENTS 6,272,245 B1 * 8/2001 Lin .............. G06K 9/00463
382/135
6,530,601 B2 3/2003 Greene
(Continued)

FOREIGN PATENT DOCUMENTS

EP 1780635 A2 5/2007
RU 95103728 12/1996

OTHER PUBLICATIONS

Product and Document Security Method, (Web Page); Apr. 26, 2011, found at http://techportal.eere.energy.gov/technology.do/techID=490, ~2 pages.

*Primary Examiner* — Barbara D Reinier
(74) *Attorney, Agent, or Firm* — HP Inc. Patent Department (57) ABSTRACT

In one example of the disclosure, it is determined, based upon a scan of an overt image included within a printed document, that the image includes a subset area with an expected marking agent response. It is determined, based upon the scan, that a feature of the subset area meets an expected quality threshold. It is determined that a data payload represented by features of the subset area matches expected data for the image. A first measurement of the subset area is made, and it is determined that the image was produced by a printing device based upon a comparison of the first measurement to a second measurement of a sample image printed by the device. Authenticity of the printed document is determined based upon the expected marking agent response, the expected quality threshold, the expected data, and the comparison of measurements.

10 Claims, 8 Drawing Sheets

(56) References Cited

U.S. PATENT DOCUMENTS

| | | |
|---|---|---|
| 6,578,712 B2 | 6/2003 | Lawandy et al. |
| 6,786,954 B1 | 9/2004 | Lee et al. |
| 7,972,426 B2 | 7/2011 | Hinch et al. |
| 8,416,463 B2 * | 4/2013 | Lynggaard .......... G06F 3/03545 358/3.28 |
| 8,514,379 B2 * | 8/2013 | Jones .................... G06Q 20/18 356/71 |
| 8,763,903 B2 * | 7/2014 | Moran ................. G06K 7/0004 235/440 |
| 2004/0081332 A1 * | 4/2004 | Tuttle ................ G06K 9/00442 382/100 |
| 2005/0169511 A1 | 8/2005 | Jones |
| 2007/0138306 A1 | 6/2007 | Obrea et al. |
| 2008/0043273 A1 | 2/2008 | Simske et al. |
| 2009/0238961 A1 | 9/2009 | Worthington et al. |
| 2010/0195894 A1 * | 8/2010 | Lohweg ............... G07D 7/2016 382/135 |
| 2013/0128319 A1 * | 5/2013 | Kenehan ................ B41M 3/144 358/3.28 |
| 2013/0335783 A1 | 12/2013 | Kurtz et al. |
| 2013/0335784 A1 | 12/2013 | Kurtz et al. |
| 2013/0336525 A1 | 12/2013 | Kurtz et al. |
| 2015/0067344 A1 * | 3/2015 | Poder .................... G06F 21/316 713/176 |
| 2015/0116530 A1 * | 4/2015 | Lau ...................... G07D 7/2008 348/222.1 |

\* cited by examiner

AUTHENTICATION OF PRINTED DOCUMENTS

BACKGROUND

Forgery, counterfeiting and fraud are problems that affect a wide range of products. Printed materials are an important means of identifying products through labels that are attached to the product or by the packaging materials that contain the product. As such, they are a primary target of fraud and often a first line of defense against such fraud. Another realm of forgery and fraud is that of high-value printed documents. These may include legal contracts, business documents, currency, checks or other monetary instruments, identity documents such as passports, ID cards, and the like.

DETAILED DESCRIPTION

Introduction

As documents are created electronically, modified, printed, signed, stored, updated, or reprinted, it sometimes becomes important to be able to identify a printed document as being an original or not. However, with increased capability in digital reproduction and printing, many of the existing methods for deterring counterfeiting become compromised and new methods are needed to address the evolving threats. For instance, existing counterfeiting and copying deterrents, such as QR noise and overt border marks, can in certain circumstances be of limited effectiveness, e.g., where the capabilities of digital reproduction and printing devices utilized by the counterfeiter exceed the sophistication of the devices utilized to create the deterrents.

To address these issues, various examples described in more detail below provide a system and a method to enable authentication of printed documents. In one example of the disclosure, it is determined, based upon a scan of an overt image included within a printed document, that the image includes a subset area with an expected marking agent response. It is determined, based upon the scan, that a feature of the subset area meets an expected quality threshold. It is determined that a data payload represented by features of the subset area matches expected data for the image. A first measurement of the subset area is made, and it is determined that the image was produced by a printing device based upon a comparison of the first measurement to a second measurement of a sample image printed by that printing device. Authenticity of the printed document is then determined based upon the expected marking agent response, the expected quality threshold, the expected data, and the comparison of measurements.

In another example of the disclosure, an authentication data payload for authenticating a printed document is received. The authentication data payload includes, for a first subset area of an overt image to be printed in a document, an expected marking agent response, expected data, and/or an expected quality threshold. The authentication payload is incorporated into a second subset area of the image according to rendering instructions such that, after printing of the document, the image is machine-interpretable to reveal the authentication data and enable authentication of the printed document, e.g., as described in the preceding paragraph.

In this manner, examples described herein may present an automated and efficient manner for application development teams to enable an overt authentication system that does not require the use of bar codes, increases graphic design flexibility, and widens the set of addressable security applications. In examples, the disclosed authentication system provides for creation and analysis of an overt image within a printed document. The image provides multiple layers or other subset areas of structure that can be constructed to be related to each other in measurable ways in a constrained amount of space. Disclosed examples will enable relating different features of the image across the spatial design of a security label or document utilizing marking agents with different photo-responses, a significant design advantage where document real-estate is at a premium.

Examples described herein will enable developers concerned with document security to incorporate amounts of information into subset areas of an overt image in an aesthetically pleasing manner. Further, the subset areas of the image can be used to specify complex relationships between the subset areas rendered by different marking agents or marking agent combinations. Examples described herein will enable detection of counterfeits that were created using the same printing equipment and the same marking agents as were used to create the authentic document.

Examples described herein will enable detection of fine elements of dots, structure, or other objects in the design that are modified in predictable ways if a high-resolution image of the design is re-printed on the same press. Examples described herein will enable the use of multiple types of marking agents, e.g., marking agents that are to be analyzed under different types of illumination to be interpreted correctly, in order to increase document security. It will be difficult to copy or clone photo-responses when, for instance, specific photoluminescent materials are used in a set of marking agents. Analysis of a scanned copy would not detect the photoluminescent signal and any copy made would not have this additional feature to authenticate. As photoluminescent nanoparticles such as quantum dots have relatively complex chemistry and the physics are difficult and expensive to formulate into marking agents appropriately, counterfeiting is further discouraged.

Further, examples provided herein enable a system wherein relationships between marking agents in image subset areas and their meanings can be dynamically changed over time, such that label content rendered in a very constrained space is difficult for a counterfeiter to reverse engineer. Thus, user satisfaction with authenticable documents created utilizing the examples described herein should increase. Likewise, user satisfaction with authentication products and services that utilize the examples described herein should increase.

The following description is broken into sections. The first, labeled "Environment," describes an environment in which various examples may be implemented. The second section, labeled "Components," describes examples of various physical and logical components for implementing various examples. The third section, labeled "Illustrative Example," presents an example of authenticating printed documents. The fourth section, labeled "Operation," describes steps taken to implement various examples.

Environment

Figure 1:
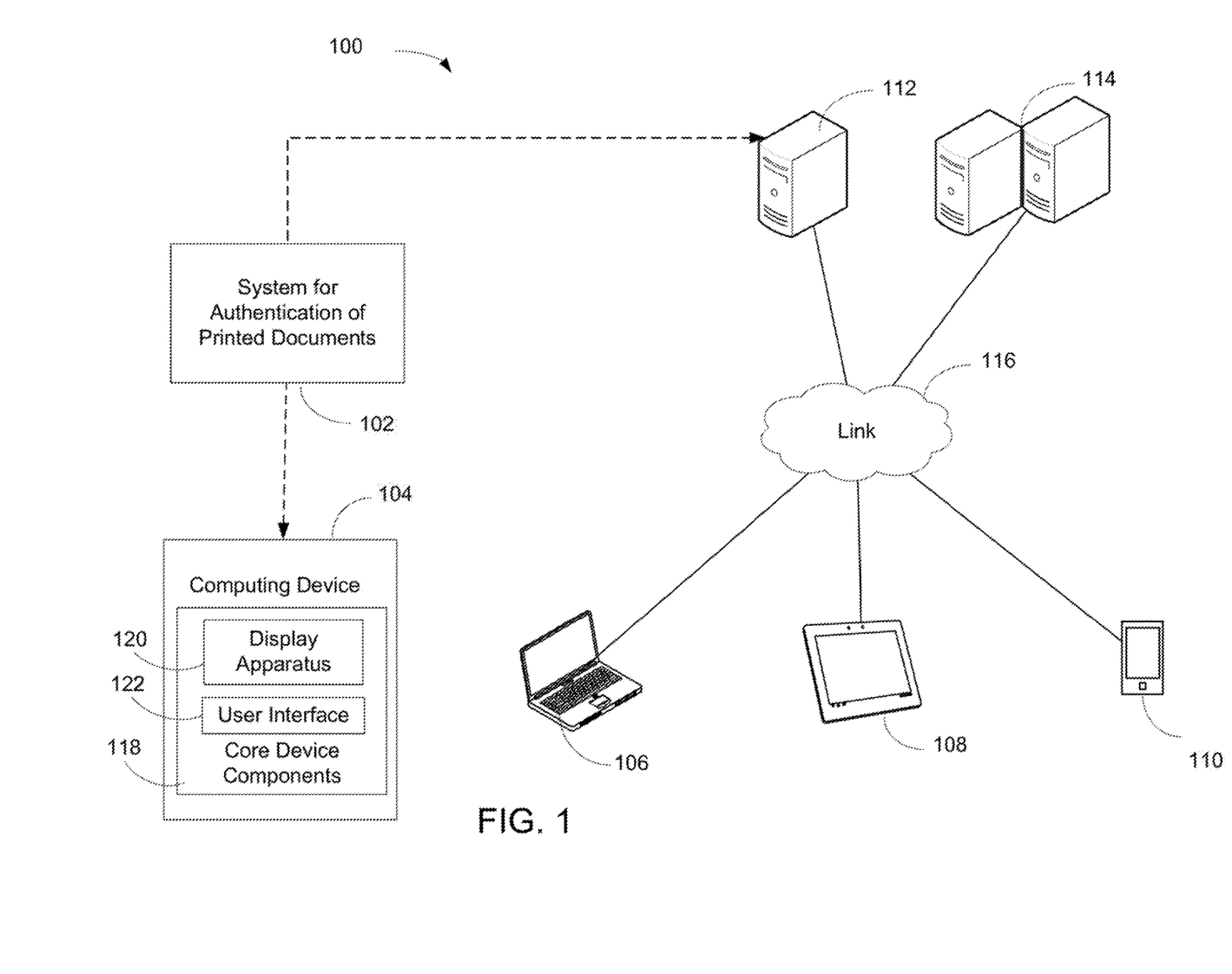
FIG. 1 is a block diagram depicting an example environment in which various examples of printed document authentication may be implemented.

FIG. 1 depicts an example environment 100 in which examples may be implemented as a system 102 to authenticate printed documents. Environment 100 is show to include computing device 104, client devices 106, 108, and 110, server device 112, and server devices 114. Components 104-114 are interconnected via link 116.

Link 116 represents generally any infrastructure or combination of infrastructures to enable an electronic connection, wireless connection, other connection, or combination thereof, to enable data communication between components 104 106 108 110 112, and 114. Such infrastructure or infrastructures may include, but are not limited to, one or more of a cable, wireless, fiber optic, or remote connections via telecommunication link, an infrared link, or a radio frequency link. For example, link 116 may represent the internet, one or more intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106-110 represent generally any computing device with which a user may interact to communicate with other client devices, server device 112, and/or server devices 114 via link 116. Server device 112 represents generally any computing device to serve an application and corresponding data for consumption by components 104-110. Server devices 114 represent generally a group of computing devices collectively to serve an application and corresponding data for consumption by components 104-110.

Computing device 104 represents generally any computing device with which a user may interact to communicate with client devices 106-110, server device 112, and/or server devices 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming to exhibit or present a message, image, view, or other presentation for perception by a user, and can include, but is not limited to, a visual, tactile or auditory display. In examples, the display apparatus 120 may be or include a monitor, a touchscreen, a projection device, a touch/sensory display device, or a speaker. User interface 122 represents generally any combination of hardware and programming to enable interaction between a user and device 104 such that the user may effect operation or control of device 104. In examples, user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

Components

Figure 2:
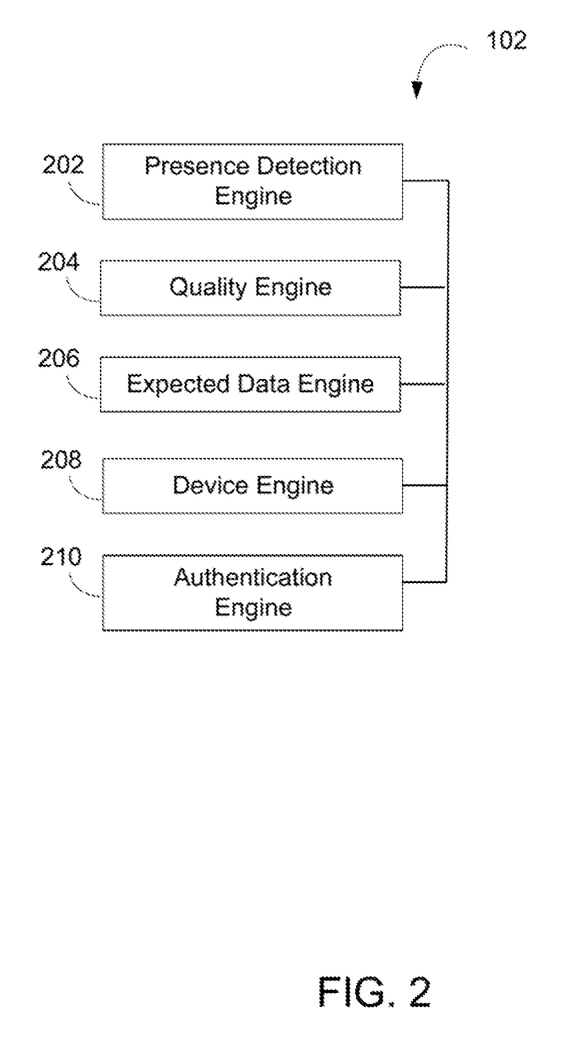
FIG. 2 is a block diagram depicting an example of a system to authenticate printed documents based upon expected marking agent responses, expected quality thresholds, expected data, and comparisons of measurements.
Figure 3:
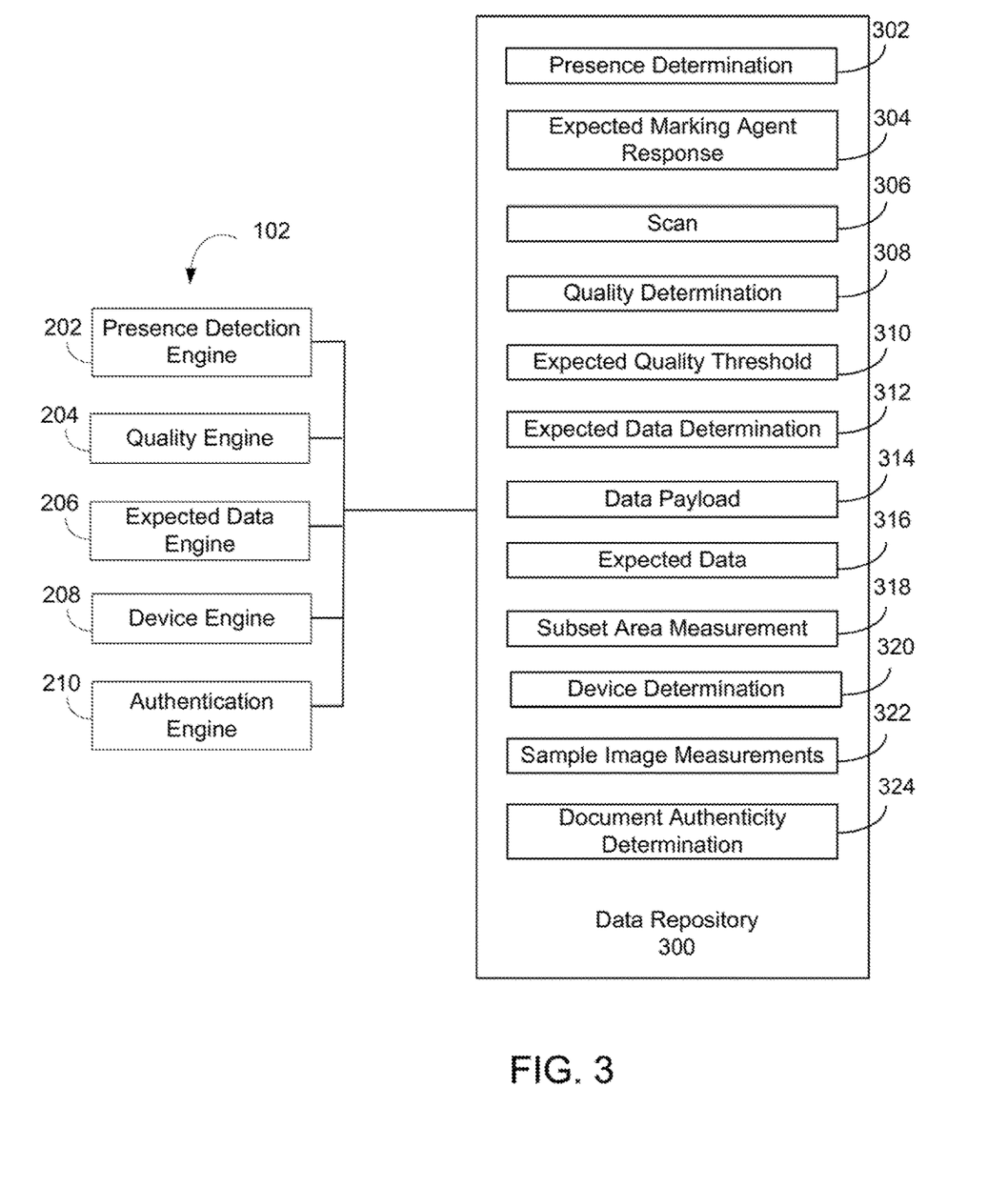
FIG. 3 is a block diagram depicting an example data structure for a system to authenticate printed documents.
Figure 4:
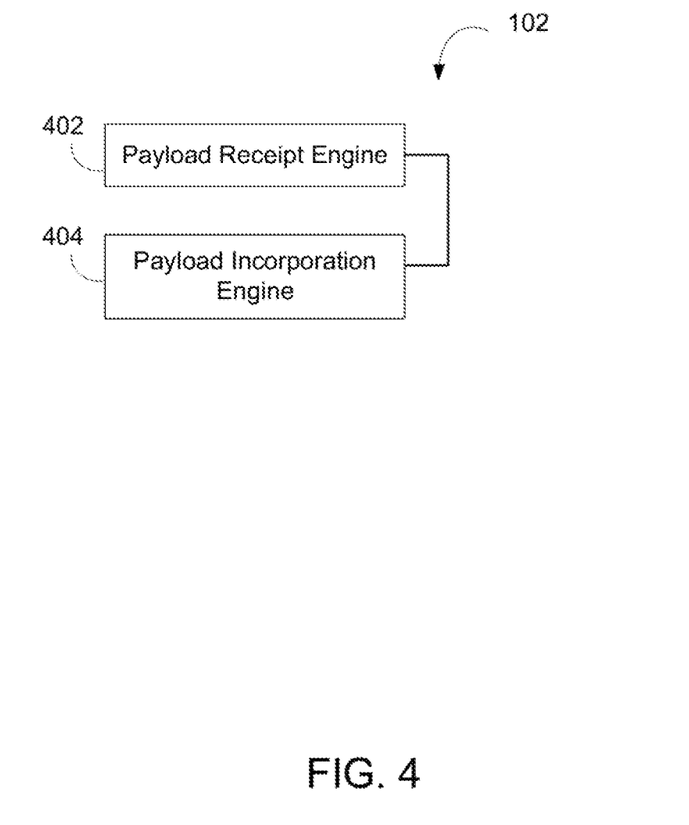
FIG. 4 is a block diagram depicting an example of a system to authenticate printed documents by incorporating machine interpretable authentication data payloads into images to be printed upon the documents.

FIGS. 2, 3, 4, 5A, and 5B depict examples of physical and logical components for implementing various examples. In FIGS. 2 and 4 various components are identified as engines 202, 204, 206, 208, 210, 402, and 404. In describing engines 202, 204, 206, 208, 210, 402, and 404 focus is on each engine's designated function. However, the term engine, as used herein, refers generally to a combination of hardware and programming to perform a designated function. As is illustrated later with respect to FIGS. 5A and 5B, the hardware of each engine, for example, may include one or both of a processor and a memory, while the programming may be code stored on that memory and executable by the processor to perform the designated function.

System 102, discussed in more detail below, represents generally a combination of hardware and programming to enable authentication of printed documents. In some examples, system 102 may be wholly integrated within core device components 118. In other examples, system 102 may be implemented as a component of any of computing device 104, client devices 106-110, server device 112, or server devices 114 where it may take action based in part on data received from core device components 118 via link 116. In other examples, system 102 may be distributed across computing device 104, and any of client devices 106-110, server device 112, or server devices 114. In a first particular example, components that implement determining that an overt image included within a printed document includes a subset area with an expected marking agent response, determining a feature of the subset area meets an expected quality threshold, determining that a data payload represented by features of the subset area matches expected data, and determining the image was produced by a printing device based upon a comparison of a made measurement to a measurement of a sample image printed by the device, may be included within computing device 104. Continuing with this first particular example, components that implement determining authenticity of the printed document based upon the expected marking agent response, the expected quality threshold, the expected data, and the comparison of measurements may be components included within a server device 112.

In a second particular example, components that implement receiving an authentication data payload for authenticating a printed document (the data payload including, for a first subset area of an overt image to be printed in a document, at least one of an expected marking agent, expected data, and an expected quality threshold) may be included within server devices 114. Continuing with this second particular example, components that implement incorporating the authentication payload into a second subset area of the image (according to rendering instructions such that, after printing of the document, the image is machine-interpretable to reveal the authentication data) may be components included within computing device 104. Other distributions of system across computing device 104, client devices 106-110, server device 112, and server devices 114 are possible and contemplated by this disclosure. It is noted that all or portions of the system 102 to authenticate printed documents may also be included on client devices 106, 108 or 110.

FIG. 2 is a block diagram depicting components of a system 102 to authenticate printed documents. In this example, system 102 includes presence detection engine 202, quality engine 204, expected data engine 206, device engine 208, and authentication engine 210. In performing their respective functions, engines 202 204 206 208, and 210 may access a data repository 300 (FIG. 3). Repository 300 (FIG. 3) represents generally any memory accessible to system 102 that can be used to store and retrieve data.

In an example, presence detection engine 202 represents generally a combination of hardware and programming to determine, based upon a scan of an overt image that appears in a printed document, that the overt image includes a subset area of the image with an expected marking agent response. As used herein, a "scan" or scanning operation refers generally to any imaging operation wherein all or a portion of a printed image is electronically sensed or reproduced. In one example, the scanning of an image may be a part of a scanning of an entire printed document. In a particular example, this type of scanning operation may be a full page scan at a copier, scanning machine, multi-purpose printer, or other imaging device. In another example, the scanning of an image may be a scan that is less than a scan of entire printed document (e.g., less than a scan of an entire printed media page). In a particular example, this type of scanning operation may be an image specific scan wherein a user utilizes a handheld scanner to scan the image.

As used herein, an "image" refers generally to a rendering of an object, scene, person, or abstraction such as text or a geometric shape. An "overt" image refers generally to an image that is visible and readable to the human eye without magnification. In examples, the overt image may be or include a one dimensional barcode, a two dimensional barcode, a data matrix combined with a graphic image, or a data grid combined with a graphic image. A "data grid" refers generally to a set of dots or objects where the spatial configuration of the dots or objects, relative to each other, can be used to represent data. A "printed document" refers generally to any media or other object that, as a result of a printing operation, contains text and/or images so as to visually convey information or a visual representation of an object (e.g., a person, building, or scene). A "printing operation" refers generally to a use of a printing device to affix text, images, or other marks upon a media or other object. As used herein, a "printing device" is synonymous with "printer", and in examples may refer to a liquid inkjet printer, solid toner-based printer, liquid toner-based printer, a multifunctional device that performs a function such as scanning and/or copying in addition to printing, or any other electronic device or group of electronic devices that consume a marking agent to produce a printed print job or printed content. A "subset area" of an image refers generally to a specific or designated portion of the image. A "marking agent response" refers generally to a parameter of a marking agent that can measured/observed with an appropriate sensor. In an example, the marking agent response could be identified or measured utilizing an optical image sensor with specific, or non-specific, illumination. In other examples, magnetic sensing methods or other sensing methods may be used to identify or measure the marking agent response. A "marking agent" refers to any substance that can be applied upon a media by a printer during a printing operation, including but not limited to aqueous inks, solvent inks, UV-curable inks, dye sublimation inks, latex inks, liquid electrophotographic inks, liquid or solid toners, and powders. An "ink" refers generally to any fluid that is to be applied to a media during a printing operation.

In an example, the marking agent included within the subset area of the image includes a photo-responsive material, and determination that the subset area has an expected marking agent response may include illuminating the subset area with specific wavelengths of light, and confirming via a sensor that the subset area emits a response with an expected spectral value. In a particular example, the determination that the subset area of the image has an expected marking agent response may include confirming via a sensor that the subset area, when exposed to an illumination source, e.g., a light of non-specific wavelengths, has an expected reflectance value indicating an expected marking agent response. In yet another example, the determination that the subset area has an expected marking agent response may include confirming via a sensor that marking agent in the subset area has expected magnetic properties.

Quality engine 204 represents generally a combination of hardware and programming to determine, based upon results of the scanning operation, that a feature of the subset area meets an expected quality threshold. As used herein, a "feature" of an image subset area refers generally to a discernible element, object, attribute, or aspect of the image subset area. In examples, an expected quality threshold may be expressed as a count or other identification of dots, marks, blotches, specks, or other image features within a subset area of the image. In other examples, an expected quality threshold may be expressed as a measure of sharpness of a feature of the image. As used herein, "sharpness" of a feature of a subject image refers generally to a measurement or assessment of an amount of detail reproduced in the feature independent of or as compared to the associated feature in a reference image. In an example, the reference image may be represented as data within the expected quality threshold data. In an example, sharpness may be characterized by the presence or lack of degradation in the subject image feature of boundaries between zones of different tones or colors that appear in the reference image. In an example, quality engine 204 may retrieve the expected quality threshold from a memory or receive the expected quality threshold from another computing device. In another example, quality engine 204 may access a data payload (e.g., in the subset area of the subject image, or in another subset area, e.g., a second subset area) to identify or access the expected quality threshold.

Expected data engine 206 represents generally a combination of hardware and programming to determine that a data payload represented by features of the subset area matches expected data for the image. As used herein, a "data payload" refers generally to data represented by, carried by, or otherwise associated with features of an image or a subset area of an image. In examples, the representation, carriage, or association of the data may be overt (e.g., visible and readable to the human eye without magnification) or may be covert (e.g., not visible and readable to the human eye without magnification). In some examples, the data payload may be in the form of or include encrypted data. In an example, expected data engine 206 may retrieve the expected data from a memory or receive the expected data from another computing device. In another example, expected data engine 206 may access another data payload (e.g., in another subset area of the image) to identify or access the expected data.

Device engine 208 represents generally a combination of hardware and programming to make a first measurement of the subset area of the image, and to determine the image was produced by a printing device based upon a comparison of the first measurement to a second measurement of a sample image printed by the device. In an example, the first and second measurements may be measurements of distances between artifacts or features common to the subset area of the image and to the sample image. In a particular example, the first measurement may be a measurement of distance between first and second objects within the subset area, wherein the same first and second objects are utilized or analyzed by quality engine 204 to confirm the subset image meets an expected quality threshold. In examples, the identified objects may be dots, marks, blotches, specks, or other image features within the subset area.

In an example, device engine 208 may determine the image was produced by a particular type or model of printing device based upon the comparison. In another example, the device engine may determine the image was produced by a particular printing device, e.g., a particular unit or machine, based upon the comparison. In a particular example, the comparison of the first measurement to the measurement or measurements of sample images printed by a printing device includes estimating a probability distribution function relative to the measurements.

In an example, device engine 208 may retrieve the second measurement (the measurement of a sample image printed by the device) from a memory or receive the second measurement from another computing device. In another example, device engine 208 may access a data payload (e.g., in the subset area of the subject image, or in another subset area of the image) to identify or access the second measurement.

Authentication engine 210 represents generally a combination of hardware and programming to make a determination of authenticity of the printed document based upon the expected marking agent response, the expected quality threshold, the expected data, and the comparison of the first and second measurements. For instance, authentication engine 210 could make an assessment that a printed document is authentic and not a counterfeit after confirming that the measured marking agent response in the subset area matches the expected response, confirming the measured quality of features of the subset area matches the expected quality threshold, confirming that a data payload represented by features of the subset area matches expected data for the image, and confirming, by comparing the first measurement of the subset area to the second measurement of the sample image, that the image was printed by an expected printing device.

In a particular example, authentication engine 210 may, following making the authenticity determination, provide an electronic message, display, cue or cause the provision of other notice to notify a user that the printed document is authentic and not a counterfeit. In examples, authentication engine 210 may provide notice of authentication or non-authentication to a computing device via a networking protocol. In examples, the networking protocol may include, but is not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

FIG. 3 depicts an example implementation of data repository 300. In this example, data repository 300 includes data representative of a presence determination 302, an expected marking agent response 304, a scan 306, a quality determination 308, an expected quality threshold 310, an expected data determination 312, a data payload 314, expected data 316, data representative of a subset area measurement 318, a device determination 320, sample image measurements 322, and a document authenticity determination 324. Referring to FIG. 3 in view of FIG. 2, in one example, presence detection engine 202 makes a presence determination 302 that an overt image included with a printed document includes an expected marking agent response 304 in either of, or both of, a first subset area and a second subset area of the image. In examples, the image may be or include a one dimensional barcode, a two dimensional barcode, a data matrix combined with a graphic image, a data grid combined with a graphic image, or any other type of image with elements that could be used to represent data. Presence detection engine 202 makes the presence determination based upon an examination or analysis of a scan 306 of the image, the scan being the product of an imaging operation performed at a computing device with a camera (e.g., smart phone computing device 110 (FIG. 1)). In a particular example, presence detection engine 202, in making the presence determination, assesses an extent to which boundaries of one of the first and second subset areas varies relative to specified boundaries. In another particular example, presence detection engine 202, in making the presence determination, assesses an extent to which one of the first and second subset areas overlaps with the other of the first and second subset areas. As used herein, to say that first and second subset areas "overlap" means that first and second subset areas of image share, at least partially, a same physical area of the image as presented in the printed document.

Continuing with the example data repository 300 of FIG. 3, quality engine 204 makes a quality determination 308, based upon the scan 306, that a feature of at least one of the first and second subset areas meets an expected quality threshold 310. Expected data engine 206 makes an expected data determination 312 that a data payload 314 represented by features of at least one of the first and second subset areas of the image matches expected data 316.

Continuing with the example data repository 300 of FIG. 3, device engine 208 makes a measurement 318 of at least one of the first and second subset areas, and makes a device determination 320 the image was printed by a specific printing device based upon a comparison of the a subset area measurement 318 to measurements representative of sample images 322 printed by the device. Authentication engine 210 makes a document authenticity determination 324 for the printed document based upon the presence determination 304, the quality determination 308, the expected data determination 312, and the device determination 320.

In examples, a specification or description of an expected property that is associated with one of the first and second subset areas and that is to be considered by the authentication module is included within a data payload 314 represented by the other of the first and second subset areas. In an example, a specification or description of the expected marking agent response 304 for one of the first and second subset areas may be included within a data payload 314 represented by the other of the first and second subset areas. In another example, a specification or description of the expected quality threshold 310 for one of the first and second subset areas may be included within a data payload 314 represented by the other of the first and second subset areas. In another example, a specification or description of the expected data 316 for one of the first and second subset areas may be included within a data payload 314 represented by the other of the first and second subset areas. In yet another example, a specification or description of the boundaries for one of the first and second subset areas may be included within a data payload 314 represented by the other of the first and second subset areas.

FIG. 4 is a block diagram depicting components of another example of a system 102 to authenticate printed documents. In this example, system 102 includes payload receipt engine 402 and payload incorporation engine 404. In performing their respective functions, engines 402 and 404 may access a data repository. In an example, payload receipt engine 402 represents generally a combination of hardware and programming to receive an authentication data payload for authenticating a printed document. The authentication data payload includes, for a first subset area of an overt image to be printed in a document, information that can be used to validate the document as authentic and not counterfeited. In examples, the payload may be or include an expected marking agent response descriptor, data expected to be found in the subset area, or a sharpness or another quality threshold that the subset area of the image is expected to meet.

Payload incorporation engine 404 represents generally a combination of hardware and programming to incorporate the received authentication payload into a second subset area of the image according to rendering instructions such that, after printing of the document, the image is machine-interpretable to reveal the authentication data. As a result, features of the second subset area of the image can hold, carry, or otherwise represent an item or items to be used for in confirming the authenticity of the document via examination of the first subset area of the image.

In a particular example, the rendering instructions are to cause the second subset area of the document to be printed with a marking agent or combination of marking agents with a prescribed expected marking agent response (e.g., a spectral, or magnetic, or other response that can be measured by a sensor) that is different than the expected marking agent response for the first subset area. In this manner, a sensed marking agent response in the second subset area can be analyzed and compared to the expected second marking agent response so as to assist in the identification of, or verification of authenticity of, the second subset area.

In examples, the incorporation of the payload data into the second subset area of the image may be overt or covert. In examples, the data payload may be incorporated into the second subset in whole or in part as encrypted data. In examples, the data payload may be retrieved from a memory, or payload incorporation engine 404 may retrieve the expected data from a memory or received from another computing device relative to the computing device(s) implementing system 102.

In the foregoing discussion of FIGS. 2, 3, and 4, engines 202, 204, 206, 208, 210, 402, and 404 were described as combinations of hardware and programming. Engines 202, 204, 206, 208, 210, 402, and 404 may be implemented in a number of fashions. Looking at FIGS. 5A and 5B the programming may be processor executable instructions stored on a tangible memory resource 502 and the hardware may include a processing resource 504 for executing those instructions. Thus memory resource 502 can be said to store program instructions that when executed by processing resource 504 implement system 102 of FIGS. 2, 3, and 4.

Memory resource 502 represents generally any number of memory components capable of storing instructions that can be executed by processing resource 504. Memory resource 502 is non-transitory in the sense that it does not encompass a transitory signal but instead is made up of more or more memory components to store the relevant instructions. Memory resource 502 may be implemented in a single device or distributed across devices. Likewise, processing resource 504 represents any number of processors capable of executing instructions stored by memory resource 502. Processing resource 504 may be integrated in a single device or distributed across devices. Further, memory resource 502 may be fully or partially integrated in the same device as processing resource 504, or it may be separate but accessible to that device and processing resource 504.

In one example, the program instructions can be part of an installation package that when installed can be executed by processing resource 504 to implement system 102. In this case, memory resource 502 may be a portable medium such as a CD, DVD, or flash drive or a memory maintained by a server from which the installation package can be downloaded and installed. In another example, the program instructions may be part of an application or applications already installed. Here, memory resource 502 can include integrated memory such as a hard drive, solid state drive, or the like.

Figure 5A:
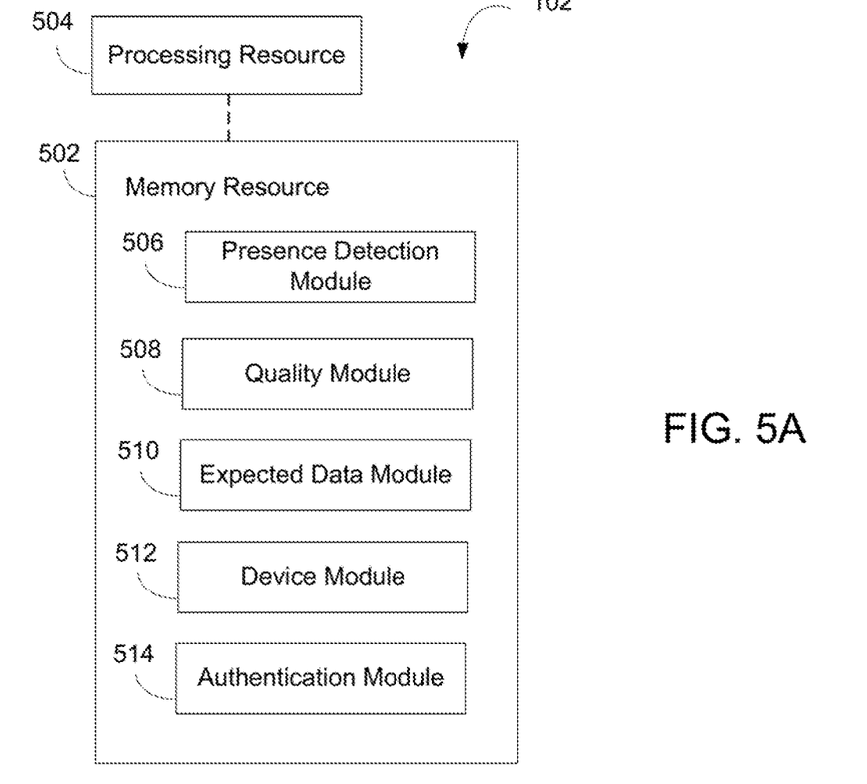
FIGS. 5A and 5B are block diagrams depicting a memory resource and a processing resource, for implementing authentication of printed documents according to examples.

In FIG. 5A, the executable program instructions stored in memory resource 502 are depicted as presence detection module 506, quality module 508, expected data module 510, device module 512, and authentication module 514. Presence detection module 506 represents program instructions that when executed by processing resource 504 may perform any of the functionalities described above in relation to presence detection engine 202 of FIG. 2. Quality module 508 represents program instructions that when executed by processing resource 504 may perform any of the functionalities described above in relation to quality engine 204 of FIG. 2. Expected data module 510 represents program instructions that when executed by processing resource 504 may perform any of the functionalities described above in relation to expected data engine 206 of FIG. 2. Device module 512 represents program instructions that when executed by processing resource 504 may perform any of the functionalities described above in relation to device engine 208 of FIG. 2. Authentication module 514 represents program instructions that when executed by processing resource 504 may perform any of the functionalities described above in relation to authentication engine 210 of FIG. 2.

Figure 5B:
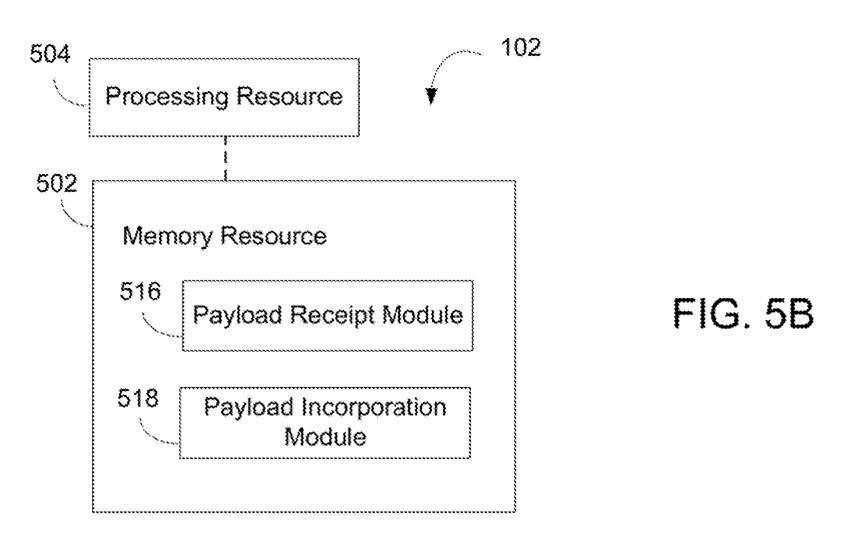

In FIG. 5B, the executable program instructions stored in memory resource 502 are depicted as payload receipt module 516 and payload incorporation module 518. Payload receipt module 516 represents program instructions that when executed by processing resource 504 may perform any of the functionalities described above in relation to payload receipt engine 402 of FIG. 4. Payload incorporation module 518 represents program instructions that when executed by processing resource 504 may perform any of the functionalities described above in relation to payload incorporation engine 404 of FIG. 4.

Illustrative Example

Figure 6:
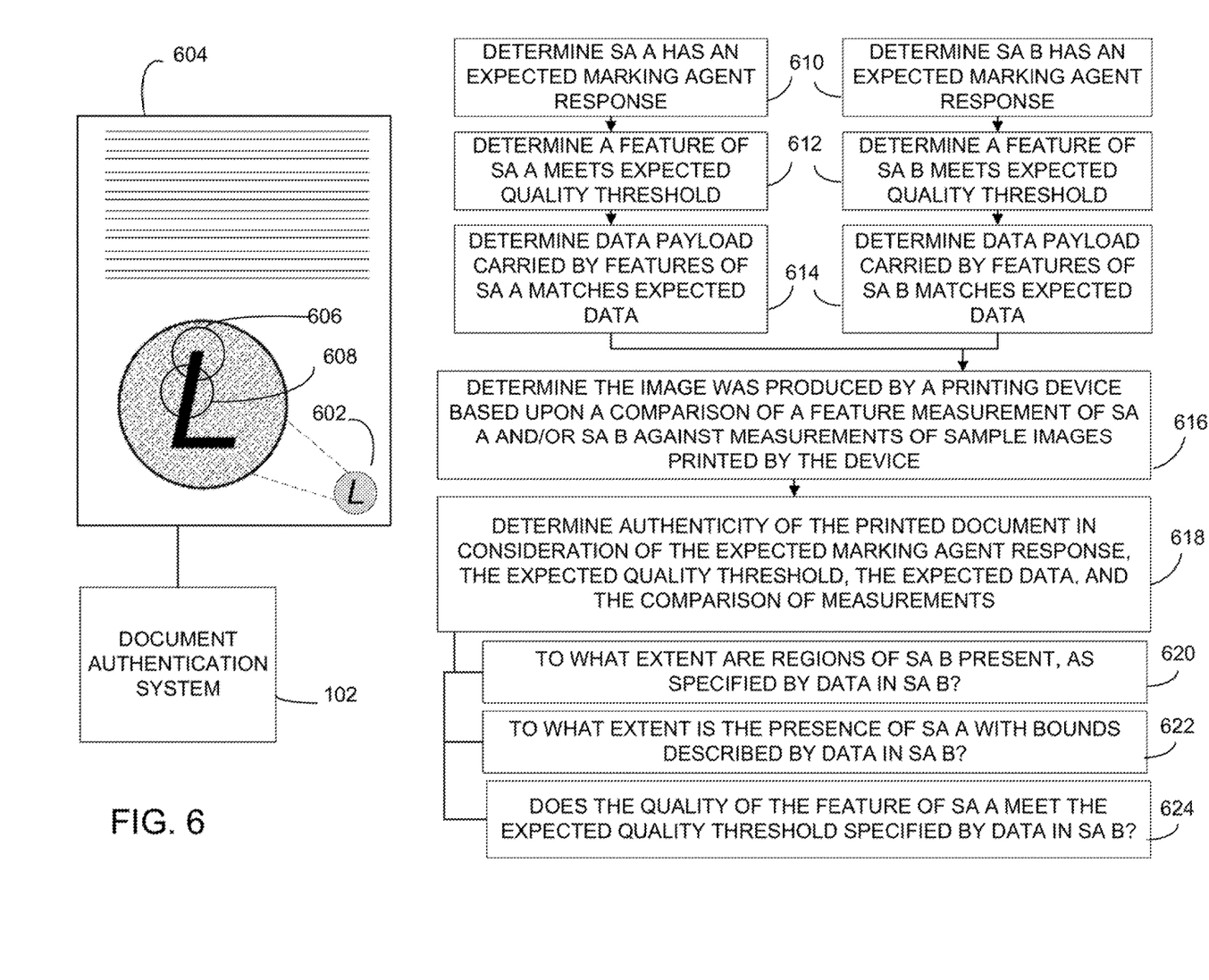
FIG. 6 illustrates an example of printed document authentication.

FIG. 6 illustrates an example of a system 102 for authentication of printed documents. In an example, document authentication system 102 determines at 610, based upon a scan (e.g., an imaging operation) of an overt image 602 included within a printed document 604, that the image 602 includes a "Subset Area A" 606 and a "Subset Area B" 608 with distinct expected marking agent responses. In this example, the overt image 602 may be a data matrix or a data grid combined with a graphic image that is a letter "L" with dots or other markings to represent or carry data.

In an example, the scanned Subset Area A 606 and/or Subset Area B 608 may include an ink that contains one or more photo-responsive materials, such that, when illuminated with specific wavelengths of light, the inks emit specific responses. In an example, the emission may be in the IR, visible or UV spectral regions. In an example, the expected marking agent response from Subset Area A 606 and/or Subset Area B 608 may be the result of interleaving of inks with different spectral responses, such that unique spectral responses occur when the image is illuminated.

Continuing with the example of FIG. 6, system 102 determines at 612, based upon the scan, that features of Subset Area A 606 and Subset Area B 608 meet expected quality thresholds. In this manner, it can also be verified that the quality of the features present is high enough to confirm the underlying data can be interpreted correctly. In the example of FIG. 6, the expected quality threshold is a measure or count of a plurality of dots or other objects detected within the scanned image compared to the numbers dots or objects denoted in the expected quality threshold data.

System 102 determines at 614, for each of Subset Area A 606 and Subset Area B 608, that a data payload represented by features of the subset area matches expected data for the image. In example, the expected data may be an expected string, an expected identifier, or any other form of data than can be compared against the data payload so as to determine a match. In examples, the expected data may be unencrypted data, or may be encrypted data.

Continuing with the example of FIG. 6, system 102 makes a measurement of a feature or features of Subset Area A 606 and/or Subset Area B 608, and determines at 616 that the image was produced by a particular printing device unit based upon a comparison of the measurement to a measurement or measurements of sample images printed by the printing device unit. In another example, the measurement of a feature or features of Subset Area A 606 and/or Subset Area B 608 may be compared to a measurement or measurements of sample images printed by a particular type (e.g., model or make) of printing device, and the determination is that the image was produced by a particular type of printer according to a probability distribution function.

Continuing with the example of FIG. 6, system 102 makes an authenticity determination at 618 (e.g., a binary authenticity determination such as "authentic" or "not authentic", or a graded authenticity score, such as "75% authenticity score", etc.) of the printed document 604 in consideration of the expected marking agent response, the expected quality threshold, the expected data, and the comparison of measurements.

In an example, in making the authenticity determination at 618, system 102 assess an extent to which boundaries of Subset Area A 606 and Subset Area B 608 vary relative to expected or specified boundaries. In another example, in making the authenticity determination at 618, system 102 assesses an extent to which boundaries of one of Subset Area A 606 and Subset Area B 608 overlap relative to the other of Subset Area A 606 and Subset Area B 608.

In particular examples, the expected marking agent response, the expected data, the expected quality threshold, and/or the boundaries for one of Subset Area A 606 and Subset Area B 608 may be indicated by a data payload represented by features of the other of Subset Area A 606 and Subset Area B 608. In particular examples, system 102 may determine authenticity of the printed document in part based upon an extent to which regions of Subset Area A 606 are present at 620, as specified by payload data represented by features of Subset Area B 608.

In other particular examples, system 102 may determine authenticity of the printed document 604 in part in based upon an extent to which Subset Area A 606 can be verified according to distinct expected marking agent responses for Subset Area A 606 at 622, wherein the expected marking agent responses are cataloged or included as payload data represented in features of Subset Area B 608.

In other particular examples, system 102 may determine authenticity of the printed document 604 in part in based upon an analysis, at 624, of whether the quality of a feature of Subset Area A 606 meets an expected quality threshold specified within payload data represented in features of Subset Area B 608.

Operation

Figure 7:
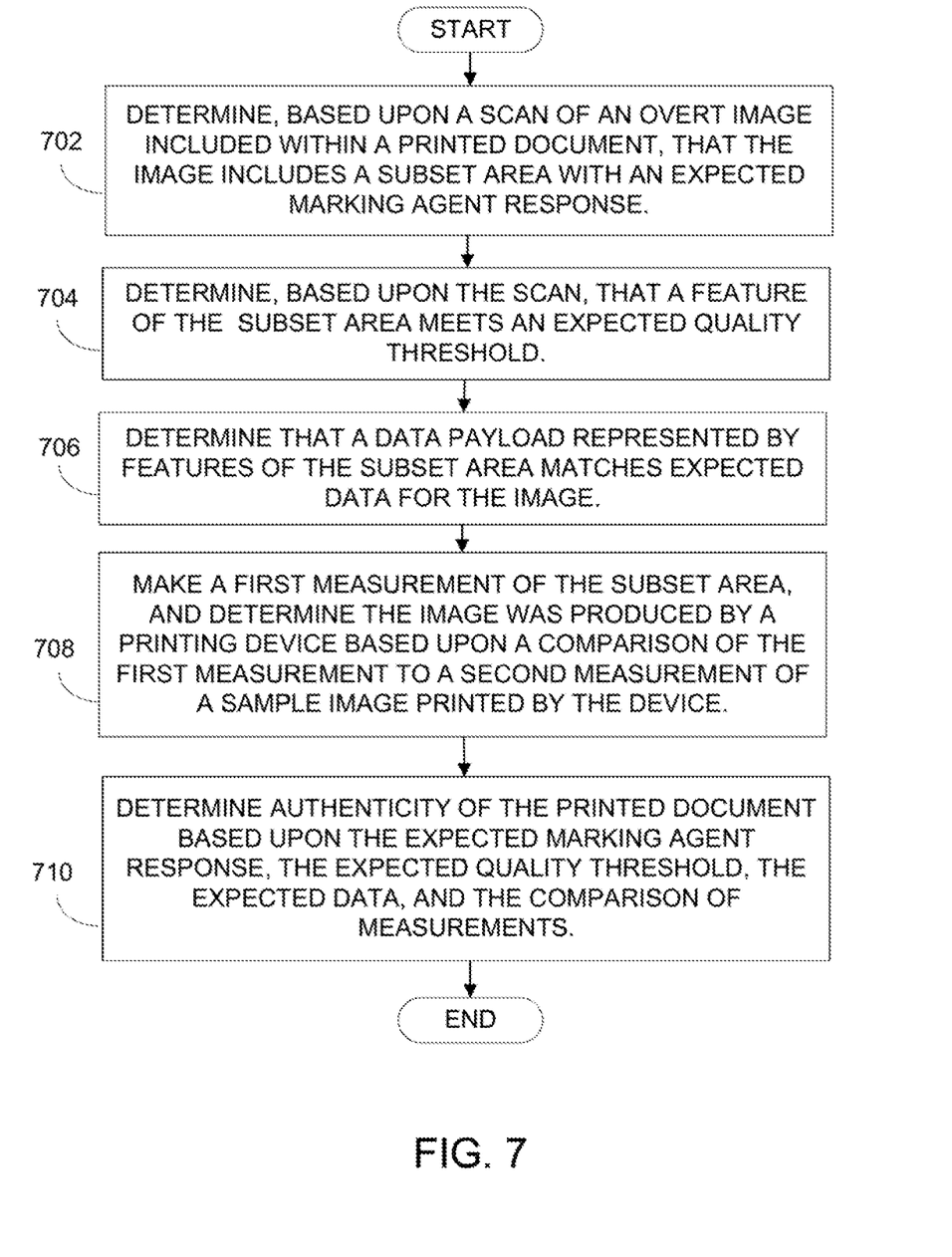
FIGS. 7 and 8 are flow diagrams depicting steps taken to implement examples of printed document authentication.

FIG. 7 is a flow diagram of steps taken to implement a method for printed document authentication. In discussing FIG. 7, reference may be made to the components depicted in FIGS. 2 and 5A. Such reference is made to provide contextual examples and not to limit the manner in which the method depicted by FIG. 7 may be implemented. It is determined, based upon a scan of an overt image included within a printed document, that the image includes a subset area with an expected marking agent response (block 702). Referring back to FIGS. 2 and 5A, presence detection engine 202 (FIG. 2) or presence detection module 506 (FIG. 5A), when executed by processing resource 504, may be responsible for implementing block 702.

It is determined, based upon the scan, that a feature of the subset area meets an expected quality threshold (block 704). Referring back to FIGS. 2 and 5A, quality engine 204 (FIG. 2) or quality module 508 (FIG. 5A), when executed by processing resource 504, may be responsible for implementing block 704.

It is determined that a data payload represented by features of the subset area matches expected data for the image (block 706). Referring back to FIGS. 2 and 5A, expected data engine 206 (FIG. 2) or expected data module 510 (FIG. 5A), when executed by processing resource 504, may be responsible for implementing block 706.

A first measurement of the subset area is made, and it is determined that the image was produced by a printing device based upon a comparison of the first measurement to a second measurement of a sample image printed by the device (block 708). Referring back to FIGS. 2 and 5A, device engine 208 (FIG. 2) or device module 512 (FIG. 5A), when executed by processing resource 504, may be responsible for implementing block 708.

Authenticity of the printed document is determined based upon the expected marking agent response, the expected quality threshold, the expected data, and the comparison of measurements (block 710). Referring back to FIGS. 2 and 5A, authentication engine 210 (FIG. 2) or authentication module 514 (FIG. 5A), when executed by processing resource 504, may be responsible for implementing block 710.

Figure 8:
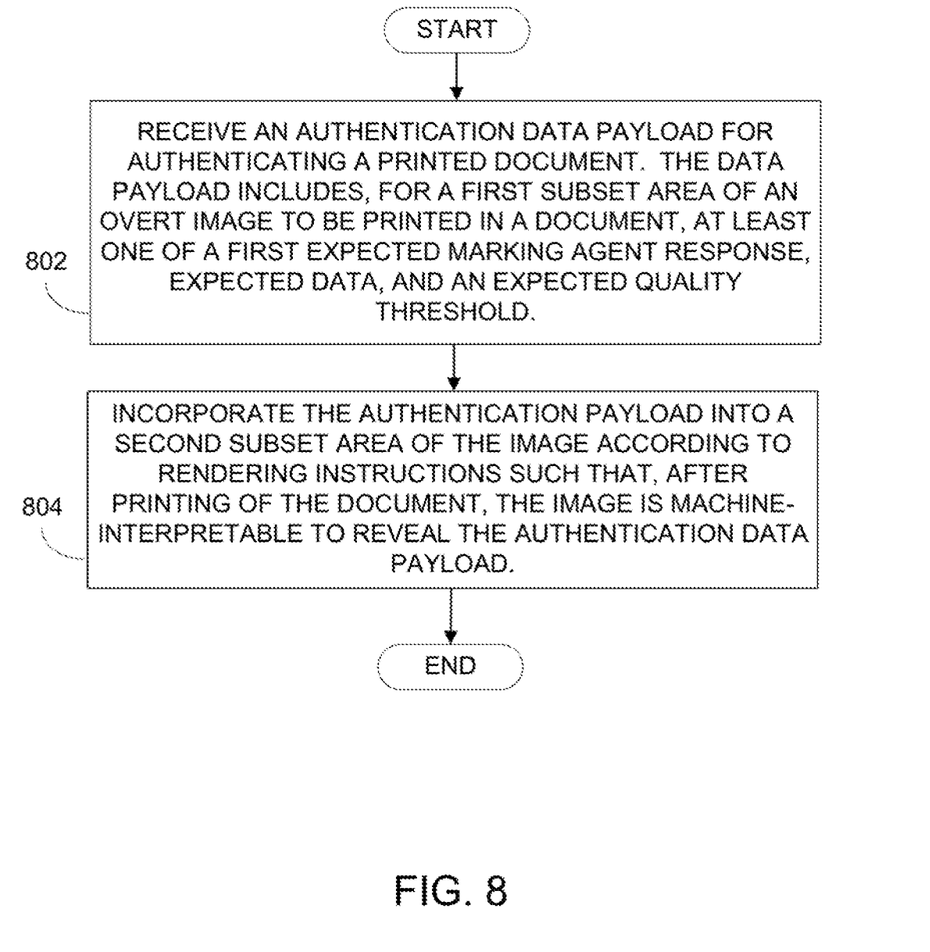

FIG. 8 is a flow diagram of steps taken to implement a method for authentication of printed documents. In discussing FIG. 8, reference may be made to the components depicted in FIGS. 4 and 5B. Such reference is made to provide contextual examples and not to limit the manner in which the method depicted by FIG. 8 may be implemented. An authentication data payload for authenticating a printed document is received. The data payload includes, for a first subset area of an overt image to be printed in a document, at least one of an expected marking agent response, expected data, and an expected quality threshold (block 802). Referring back to FIGS. 4 and 5B, payload receipt engine 402 (FIG. 4) or payload receipt module 516 (FIG. 5B), when executed by processing resource 504, may be responsible for implementing block 802.

The authentication payload is incorporated into a second subset area of the image according to rendering instructions such that, after printing of the document, the image is machine-interpretable to reveal the authentication data payload (block 804). Referring back to FIGS. 4 and 5B, payload incorporation engine 404 (FIG. 4) or payload incorporation module 518 (FIG. 5B), when executed by processing resource 504, may be responsible for implementing block 804.

CONCLUSION

FIGS. 1-8 aid in depicting the architecture, functionality, and operation of various examples. In particular, FIGS. 1, 2, 3, 4, 5A, and 5B depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Examples can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the example of FIG. 6 and the flow diagrams of FIGS. 7 and 8 each show a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been shown and described with reference to the foregoing examples. It is to be understood, however, that other forms, details and examples may be made without departing from the spirit and scope of the invention that is defined in the following claims. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A system, comprising:
a processor;
a memory storing instructions executable by the processor to:
determine, based upon a scan of an overt image included within a printed document, that the image includes a first subset area with an expected marking agent response, by determining that the first subset area has an expected magnetic property via magnetic sensing;
determine, based upon the scan, that a feature of a second subset area meets an expected quality threshold, by determining that the feature includes an expected count of dots within the second subset area;
in response to determining that the feature of the second subset area meets the expected quality threshold, determine a data payload represented and carried by features of the second subset area, the data payload indicating the expected marking agent response of the first subset area;
make a first measurement of the first subset area, and to determine the image was produced by a specific printing device or a specific kind of printing device based upon a comparison of the first measurement to a second measurement of a sample image printed by the specific printing device or the specific kind of printing device; and
determine authenticity of the printed document based upon the expected marking agent response, the expected quality threshold, the expected data, and the comparison of measurements.

2. The system of claim 1, wherein the comparison of the first measurement to measurements of sample images printed by the device includes estimating a probability distribution function.

3. The system of claim 1, wherein the expected quality threshold is a measure of sharpness of a feature of the image.

4. The system of claim 1, wherein the expected quality threshold is an identification or count of a plurality of objects within the image, and wherein the first measurement is a measurement of distance between first and second objects of the plurality.

5. A memory resource storing instructions that when executed cause a processor to determine authenticity of printed documents by:
making a first determination, based upon a scan of an overt image included within a printed document, that the image includes an expected marking agent response in at least one of a first subset area and a second subset area, by determining that the first subset area has an expected magnetic property via magnetic sensing;
making a second determination, based upon the scan, that a feature of the second subset area meets an expected quality threshold, by determining that the feature includes an expected count of dots;
in response to determining that the feature meets the expected quality threshold, making a third determination of a data payload represented and carried by features of the second subset area, the data payload indicating the expected marking agent response of the first subset area;

making a measurement within at least one of the first and second subset areas, and to make a fourth determination the image was printed by a specific printing device or a specific kind of printing device based upon a comparison of the measurement to measurements of sample images printed by the specific printing device or the specific kind of printing device; and determining authenticity of the printed document based upon the first, second, third, and fourth determinations.

6. The memory resource of claim 5, wherein the instructions when executed cause the processing resource to assess an extent to which boundaries of the first and second subset areas vary relative to an expected geometrical relationship between the first and second subset areas.

7. The memory resource of claim 5, wherein the instructions when executed cause the processing resource to assess an extent to which one of the first and second subset areas overlaps with the other of the first and second subset areas.

8. A method comprising:

determining, based upon a scan of an overt image included within a printed document, that the image includes a first subset area with an expected marking agent response, by determining that the first subset area has an expected magnetic property via magnetic sensing;

determining, based upon the scan, that a feature of a second subset area meets an expected quality threshold, by determining that the feature includes an expected count of dots within the second subset area;

in response to determining that the feature of the second subset area meets the expected quality threshold, determining that a data payload represented and carried by features of the second subset area, the data payload indicating the expected marking agent response of the first subset area;

making a first measurement of the first subset area, and determining that the image was produced by a specific printing device or a specific kind of printing device based upon a comparison of the first measurement to a second measurement of a sample image printed by the specific printing device or the specific kind of printing device; and determining authenticity of the printed document based upon the expected marking agent response, the expected quality threshold, the expected data, and the comparison of measurements.

9. The method of claim 8, wherein determining the authenticity of the printed document comprises assessing an extent to which boundaries of the first and second subset areas vary relative to an expected geometrical relationship between the first and second subset areas.

10. The method of claim 8, wherein determining that the image includes the subset area comprises assessing an extent to which one of the first and second subset areas overlaps with the other of the first and second subset areas.

* * * * *